US007016836B1

(12) United States Patent
Yoda

(10) Patent No.: US 7,016,836 B1
(45) Date of Patent: Mar. 21, 2006

(54) CONTROL USING MULTIPLE SPEECH RECEPTORS IN AN IN-VEHICLE SPEECH RECOGNITION SYSTEM

(75) Inventor: Shoutarou Yoda, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 189 days.

(21) Appl. No.: 09/651,058

(22) Filed: Aug. 30, 2000

(30) Foreign Application Priority Data

Aug. 31, 1999 (JP) ............................... 11-246393

(51) Int. Cl.
G10L 15/20 (2006.01)
(52) U.S. Cl. .................... 704/233; 704/231; 704/226; 704/270; 704/240; 455/563; 455/575; 455/9
(58) Field of Classification Search ........ 704/270–275, 704/270.1, 233, 248, 227, 234, 232, 240, 704/231; 379/206.01; 455/563, 575.9
See application file for complete search history.

(56) References Cited

U.S. PATENT DOCUMENTS

| | | | | |
|---|---|---|---|---|
| 4,449,238 A | * | 5/1984 | Lee et al. .............. 379/206.01 |
| 4,627,091 A | * | 12/1986 | Fedele .......................... 704/233 |
| 5,086,385 A | * | 2/1992 | Launey et al. ................. 700/83 |
| 5,214,707 A | * | 5/1993 | Fujimoto et al. ............ 704/275 |
| 5,297,210 A | * | 3/1994 | Julstrom ................ 379/206.01 |
| 5,319,736 A | * | 6/1994 | Hunt .......................... 704/227 |
| 5,561,737 A | * | 10/1996 | Bowen ........................ 704/275 |
| 5,625,697 A | * | 4/1997 | Bowen et al. .......... 379/206.01 |
| 5,737,485 A | * | 4/1998 | Flanagan et al. ............ 704/234 |
| 6,052,665 A | * | 4/2000 | Momii et al. ................ 704/270 |
| 6,134,524 A | * | 10/2000 | Peters et al. ................. 704/233 |
| 6,230,138 B1 | * | 5/2001 | Everhart ...................... 704/275 |
| 6,240,347 B1 | * | 5/2001 | Everhart et al. ............. 704/275 |
| 6,420,975 B1 | * | 7/2002 | DeLine et al. ............ 340/815.4 |
| 6,449,593 B1 | * | 9/2002 | Valve ......................... 704/233 |

FOREIGN PATENT DOCUMENTS

| | | | |
|---|---|---|---|
| JP | 02-077799 | * | 3/1990 |
| JP | 04-163496 | * | 6/1992 |
| JP | 08-328579 | * | 12/1996 |

OTHER PUBLICATIONS

Abstract of Japanese Patent Publication No. 04212600; dated Aug. 4, 1992.
Abstract of Japanese Patent Publication No. 03284589; dated Dec. 16, 1991.
Abstract of Japanese Patent Publication No. 06062103; dated Mar. 4, 1994.

* cited by examiner

Primary Examiner—Vijay B. Chawan
(74) Attorney, Agent, or Firm—Arent Fox PLLC

(57) ABSTRACT

Disclosed are a speech recognition system which comprises the following components, and a speech recognition method for this speech recognition system. The speech recognition system comprises a plurality of voice pickup sections for picking up uttered voices, a determination section for determining a speech signal suitable for speech recognition from speech signals output from the plurality of voice pickup sections, and a speech recognizer for performing speech recognition based on the speech signal determined by the determination section.

3 Claims, 10 Drawing Sheets

F I G. 6 A
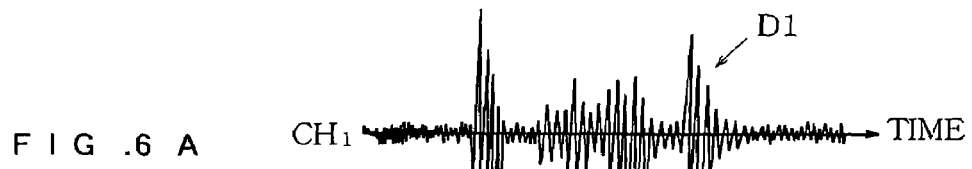
F I G. 6 B
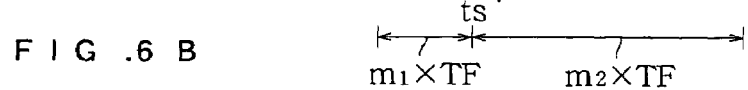
F I G. 6 C
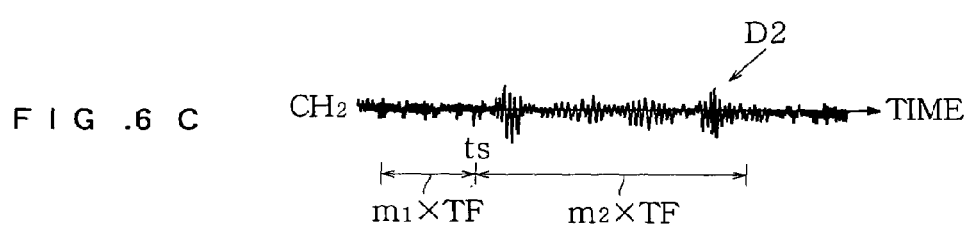
F I G. 6 D
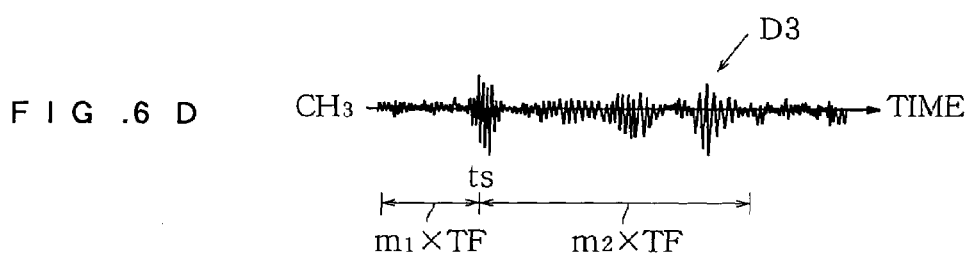
F I G. 6 E
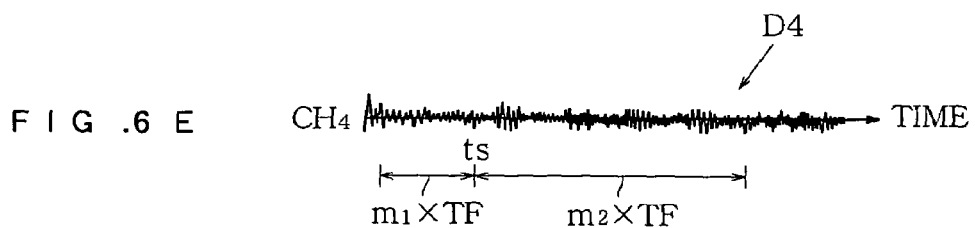

FIG. 7

| RANKING | AVERAGE S/N | AVERAGE VOICE POWER |
|---|---|---|
| Rnk0 | MAXIMUM VALUE | MAXIMUM VALUE |
| Rnk1 | THD2 OR GREATER | THD3 OR GREATER |
| Rnk2 | THD2 OR GREATER | SMALLER THAN THD3 |
| Rnk3 | SMALLER THAN THD2 | THD3 OR GREATER |
| Rnk4 | SMALLER THAN THD2 | SMALLER THAN THD3 |

FIG. 8

| | CH1 | CH2 | CH3 | CH4 | ..... | NOISE CHANNEL |
|---|---|---|---|---|---|---|
| CASE 1 | Rnk0 | Rnk1 | Rnk2 | Rnk1 | ..... | CH3 |
| CASE 2 | Rnk0 | Rnk1 | Rnk1 | Rnk2 | ..... | CH4 |
| CASE 3 | Rnk0 | Rnk1 | Rnk1 | Rnk3 | ..... | CH4 |
| CASE 4 | Rnk0 | Rnk1 | Rnk1 | Rnk4 | ..... | CH4 |
| CASE 5 | Rnk0 | Rnk1 | Rnk2 | Rnk1 | ..... | CH3 |
| CASE 6 | Rnk0 | Rnk1 | Rnk2 | Rnk2 | ..... | CH3 |
| CASE 7 | Rnk0 | Rnk1 | Rnk2 | Rnk3 | ..... | CH3 |
| CASE 8 | Rnk0 | Rnk1 | Rnk2 | Rnk4 | ..... | CH3 |
| CASE 9 | Rnk0 | Rnk1 | Rnk3 | Rnk1 | ..... | CH3 |

CONTROL USING MULTIPLE SPEECH RECEPTORS IN AN IN-VEHICLE SPEECH RECOGNITION SYSTEM

BACKGROUND OF THE INVENTION

1. Field of the Invention

The present invention relates to a speech recognition system capable of allowing electronic equipments to be controlled or manipulated with uttered voices or speeches, and a speech recognition method for use in such a speech recognition system.

2. Description of the Related Art

Known speech recognition systems of this type are adapted to electronic equipments, such as an on-board audio system and an on-board navigation system.

In an on-board audio system equipped with a speech recognition system, when a passenger says the name of a desired radio broadcasting station, for example, the speech recognition system recognizes the uttered speech and automatically tunes to the reception frequency of the radio broadcasting station based on the recognition result. This improves the operability of the on-board audio system and makes it easier for a passenger to use the on-board audio system.

This speech recognition system also has other capabilities that relieve a passenger of the burden of operating an MD (Mini Disc) player and/or CD (Compact Disc) player. When the passenger loads an information-carrying recording/reproducing medium, such as an MD disc, into the MD player and says the title of a musical piece recorded on that recording/reproducing medium, for example, the speech recognition system recognizes the uttered speech and automatically plays the selected musical piece.

An on-board navigation system equipped with a speech recognition system is provided with a capability of recognizing a speech uttered by a driver or the like to specify the name of the destination and displaying a map showing the route from the present location to the destination. This capability allows the driver to concentrate on driving a vehicle, thus ensuring safer driving environments.

The above-described conventional speech recognition systems are designed to cope with a single person who utters words of instructions. The conventional speech recognition systems therefore have only a single microphone for inputting speeches provided at a location nearest to a driver who is very likely to use the microphone.

Other passengers who are seated far from the microphone should therefore utter loud voices toward the microphone to secure a sufficient input voice level. To improve the speech recognition precision of such a speech recognition system, other passengers than the driver should also utter loud voices toward the microphone to input uttered speeches into the microphone without being affected by noise in a vehicle.

SUMMARY OF THE INVENTION

Accordingly, it is an object of the present invention to provide a speech recognition system which has an improved operability and can allow more than one person to secure a sufficient input voice level without uttering loud voices or without being affected by ambient noise.

It is another object of this invention to provide a speech recognition method for use in a speech recognition system, which improves the operability of the speech recognition system.

To achieve the first object, according to one aspect of this invention, there is provided a speech recognition system which comprises a plurality of voice pickup sections for picking up uttered voices; a determination section for determining a speech signal suitable for speech recognition from speech signals output from the plurality of voice pickup sections; and a speech recognizer for performing speech recognition based on the speech signal determined by the determination section.

According to another aspect of this invention, there is provided a speech recognition method for a speech recognition system having a plurality of voice pickup means for picking up voices, which comprises a determination step of determining a speech signal suitable for speech recognition from speech signals output from the plurality of voice pickup means; and a speech recognition step of performing speech recognition based on the speech signal determined by the determination step.

In the speech recognition system or speech recognition method, that of the speech signals output from the plurality of voice pickup sections (voice pickup means) whose speech level is equal to or higher than a predetermined speech level and continues over a predetermined period of time may be determined as the speech signal suitable for speech recognition.

It is preferable that the determination section (or step) acquires an average S/N value and average voice power of each of the speech signals output from the plurality of voice pickup sections (or voice pickup means) and determines that of the speech signal whose average S/N value and average voice power are greater than respective predetermined threshold values as the speech signal suitable for speech recognition.

In this case, it is preferable that the determination section determines a candidate order of those speech signals whose average S/N values and average voice powers are greater than the respective predetermined threshold values and which are candidates for the speech signal suitable for speech recognition, in accordance with the average S/N values and average voice powers; and the speech recognizer sequentially executes speech recognition on the candidates in accordance with the candidate order from a highest candidate to a lower one.

In any of the speech recognition system and method and their preferable modes, the determination section (or step) treats those of the speech signals which are other than the speech signal suitable for speech recognition as noise signals.

In any of the speech recognition system and method and their preferable modes, of other speech signals than the speech signal suitable for speech recognition, that speech signal whose average S/N value and average voice power become minimum may be treated as a noise signal by the determination section.

With the above structures, when a speaker makes a desired speech, a speech signal and a noise signal suitable for speech recognition are automatically determined from the individual speech signals output from a plurality of voice pickup sections (or voice pickup means) and speech recognition is carried out based on the determined speech signal and noise signal. Accordingly, the speaker has only to utter words or voices without consciously making such a speech to a specific voice pickup section. This leads to an improved operability of the speech recognition system.

BRIEF DESCRIPTION OF THE DRAWINGS

FIG. 3A is a plan view exemplifying the layout of microphones in a wagon or the like;

FIG. 3B is a plan view showing another layout of microphones in a wagon or the like;

FIGS. 6A through 6D are explanatory diagrams for explaining how to compute an average voice power, an average noise power and an average S/N value;

FIG. 7 is an explanatory diagram showing the structure of a speech condition table;

FIG. 8 is an explanatory diagram showing the structure of a noise selection table;

DETAILED DESCRIPTION OF THE PREFERRED EMBODIMENT

With reference to the accompanying drawings, a description will now be given of a preferred embodiment of the present invention as adapted to a speech recognition system which can ensure voice- or speech-based control or manipulation of an electronic equipment installed in a vehicle, such as an on-board audio system or an on-board navigation system.

Figure 1:
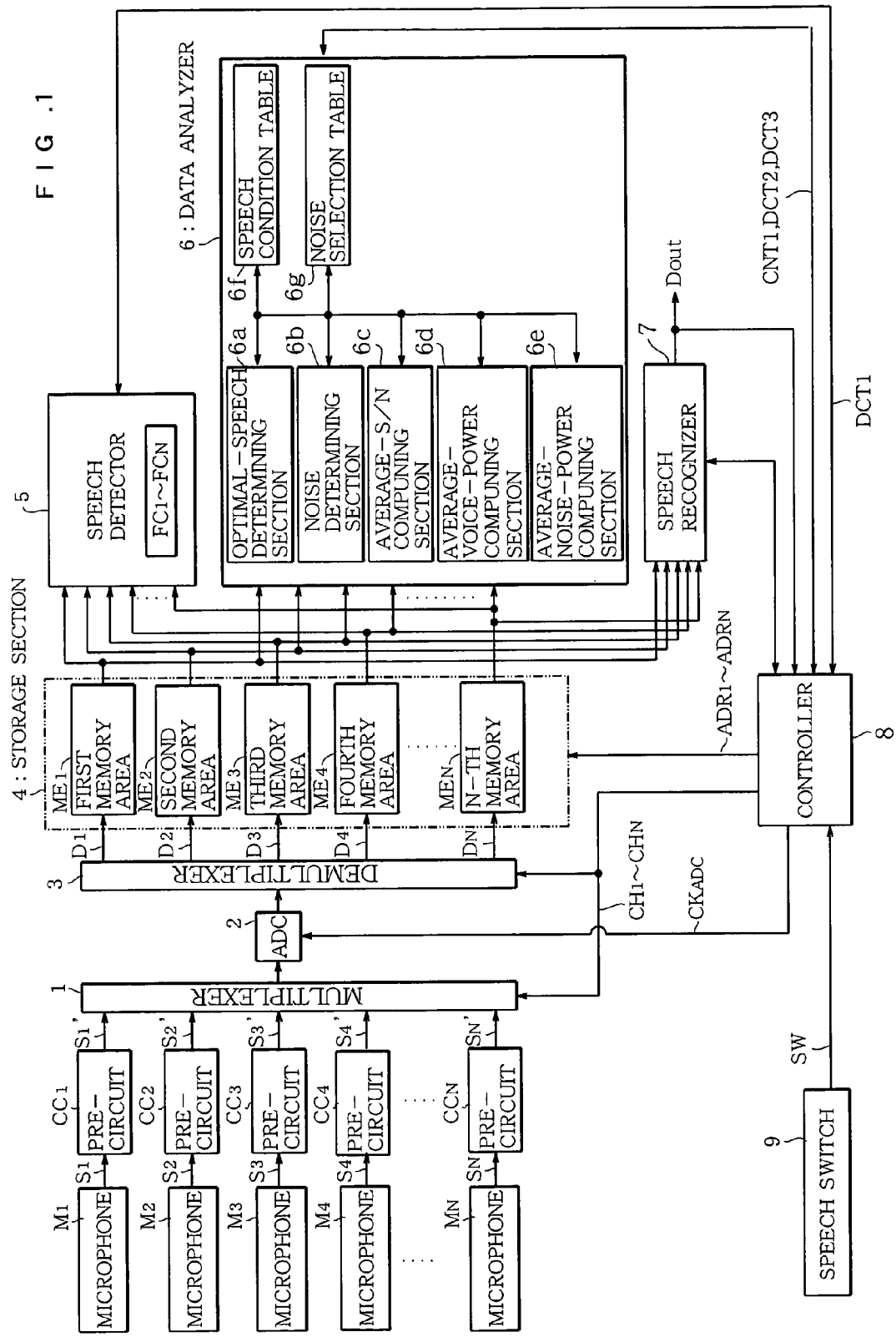
FIG. 1 is a block diagram illustrating the structure of a speech recognition system according to one embodiment of the present invention.

FIG. 1 is a block diagram illustrating the structure of a speech recognition system according to this embodiment of this invention. Referring to this diagram, the speech recognition system comprises a plurality of microphones $M_1$ to $M_N$ as voice pickup means, a plurality of pre-circuits $CC_1$ to $CC_N$, a multiplexer 1, an A/D (Analog-to-Digital) converter (ADC) 2, a demultiplexer 3, a storage section 4, a speech detector 5, a data analyzer 6, a speech recognizer 7, a controller 8 and a speech switch 9.

The pre-circuits $CC_1$–$CC_N$, the multiplexer 1, the A/D converter 2, the demultiplexer 3, the storage section 4, the speech detector 5, the data analyzer 6 and the controller 8 constitute determination means which determines a speech signal and noise signal suitable for speech recognition.

The single speech switch 9 is provided in the vicinity of a driver seat, for example, on a front dash board or one end of a front door by the driver seat.

The controller 8 has a microprocessor (MPU), which controls the general operation of this speech recognition system. When the speech switch 9 is switched on, sending an ON signal SW to the microprocessor, the microprocessor causes the microphones $M_1$–$M_N$ to initiate a voice pickup operation.

The speech detector 5 has number-of-speeches counters $FC_1$–$FC_N$ that are used to determine to which microphone an uttered speech is directed, though their details will be given in a later description of the operation of the speech recognition system.

The individual microphones $M_1$–$M_N$ are provided at locations where it is easy to pick up speeches uttered by individual passengers, e.g., in the vicinity of the individual passenger seats including the driver seat.

Figure 2A:
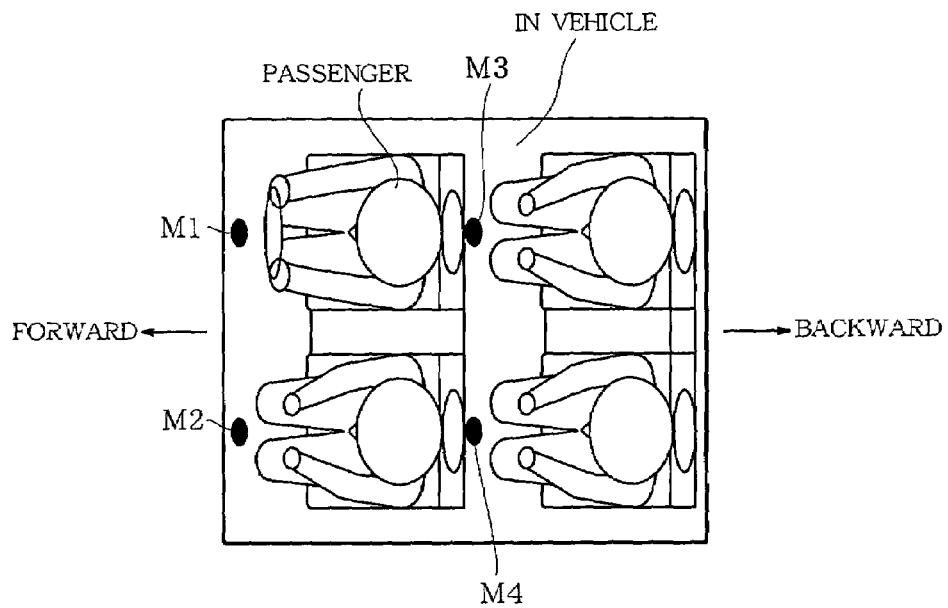
FIG. 2A is a plan view exemplifying the layout of microphones in an ordinary 4-seat vehicle.

In one example where four microphones $M_1$–$M_4$ are placed in a 4-seat vehicle, the microphones $M_1$ and $M_2$ are placed in front of the driver seat and the front passenger seat and the microphones $M_3$ and $M_4$ are placed in front of the rear passenger seats, e.g., the corresponding roof portions or at the back of the driver seat and the front passenger seat as shown in a plan view of FIG. 2A. This way, the individual microphones $M_1$–$M_4$ are associated with the respective passengers.

Figure 2B:
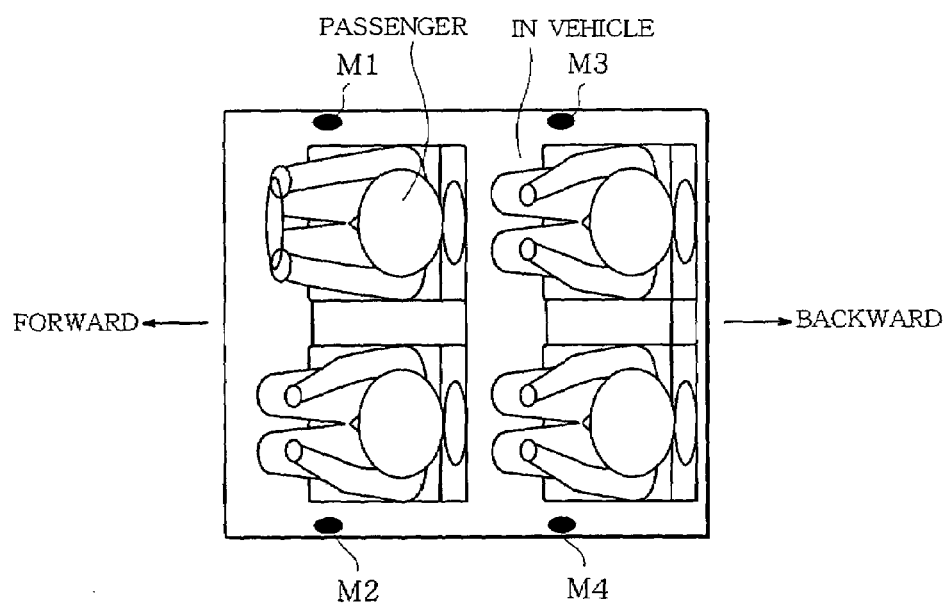
FIG. 2B is a plan view showing another layout of microphones in an ordinary 4-seat vehicle.

In another example as shown in a plan view of FIG. 2B, the microphones $M_1$ and $M_2$ may be placed in the front door by the driver seat and the front door by the front passenger seat and the microphones $M_3$ and $M_4$ are placed in the rear doors by the respective rear passenger seats, so that the individual microphones $M_1$–$M_4$ are associated with the respective passengers.

In a further example, the microphones $M_1$–$M_4$ may be provided at combined locations shown in FIGS. 2A and 2B. Specifically, the microphone $M_1$ is placed in front of the driver seat as shown in FIG. 2A or in the front door by the driver seat as shown in FIG. 2B, so that a single microphone is provided for the driver who sits on the driver seat. Likewise, either the location shown in FIG. 2A or the location shown in FIG. 2B is selected for any of the remaining microphones $M_2$–$M_4$.

Figure 3A:
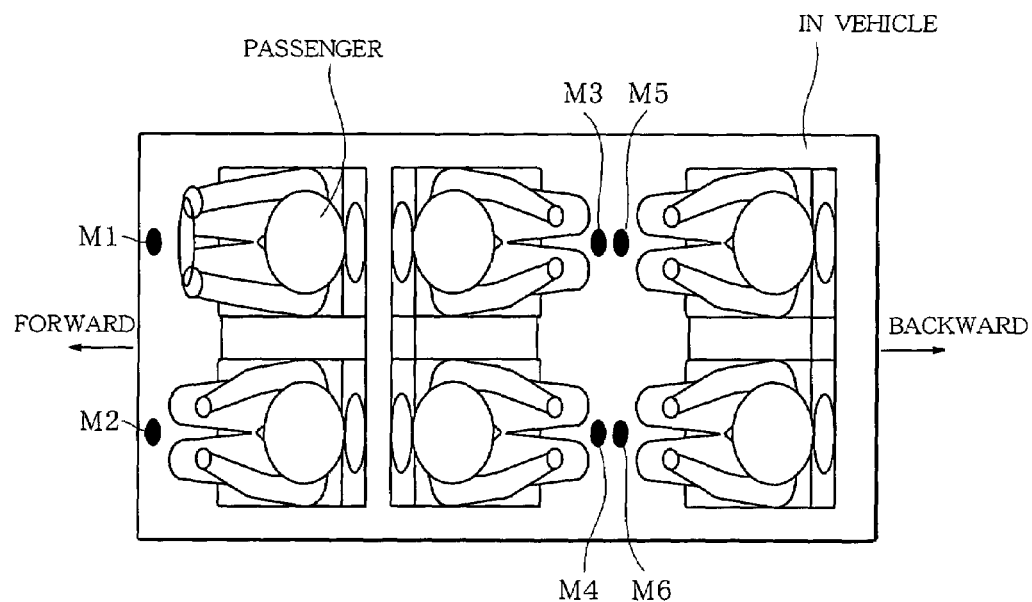
Figure 3B:
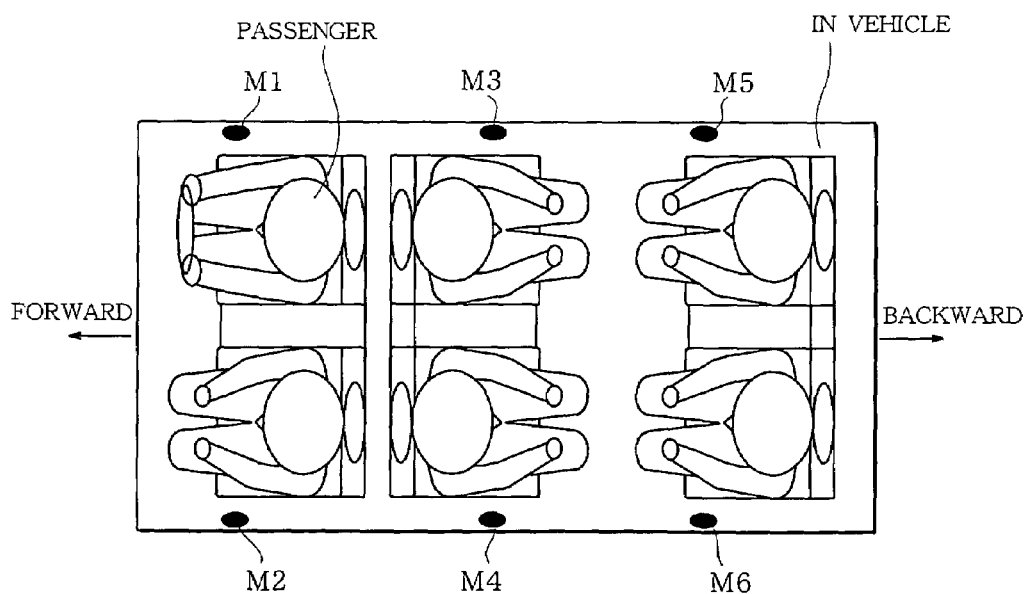

In the case of a wagon type vehicle or the like which holds a greater number of seats, for example, a greater number of microphones $M_1$–$M_6$ are provided in accordance with the seats and at the locations where it is easy to pick up speeches uttered by individual passengers, as shown in plan views of FIGS. 3A and 3B. Note that the microphones $M_1$–$M_6$ may be provided at combined locations shown in FIGS. 3A and 3B as per the aforementioned case of the 4-seat vehicle.

It is to be noted that the aforementioned microphone layouts have been given simply as examples, and are to be considered as illustrative and not restrictive. Actually, system information that is used in the speech recognition system of this invention is constructed beforehand in consideration of the characteristics of voice transmission from individual passengers to the respective microphones. Strictly speaking, therefore, the conditions for setting the microphones are not restricted at all. Further, the number of microphones can be determined to be equal to or smaller than the number of maximum passengers predetermined in accordance with the type of a vehicle.

The layout of the individual microphones is not limited to a simple layout that makes the distances between the microphones to the respective passengers equal to one another. Those distances and the locations of the individual microphones may be determined based on the results of analysis of the voice characteristics in a vehicle previously acquired through experiments or the like in such a way that the characteristics of voice transmission from the microphones to the respective passengers become substantially the same.

Returning to FIG. 1, the microphones $M_1$–$M_N$ are connected to the respective pre-circuits $CC_1$–$CC_N$, thus constituting N channels of signal processing systems.

Each of the pre-circuits $CC_1$–$CC_N$ has an amplifier (not shown) which amplifies the amplitude level of the associated one of input speech signals $S_1$ to $S_N$, supplied from the microphones $M_1$–$M_N$, to the level that is suitable for signal processing, and a band-pass filter (not shown) which passes only a predetermined frequency component of the amplified input speech signal. The pre-circuits $CC_1$–$CC_N$ supply input speech signals $S_1'$ to $S_N'$, which have passed the respective band-pass filters, to the multiplexer 1.

Each band-pass filter is set with a low cut-off frequency $f_L$ (e.g., $f_L$=100 Hz) for eliminating low-frequency noise included in the associated one of the input speech signals $S_1$–$S_N$ and a high cut-off frequency $f_H$ in consideration of the Nyquist frequency. The low cut-off frequency $f_L$ and high cut-off frequency $f_H$ are set so that the frequency range of voices that human beings utter is included in the range between those two frequencies.

Figure 4:
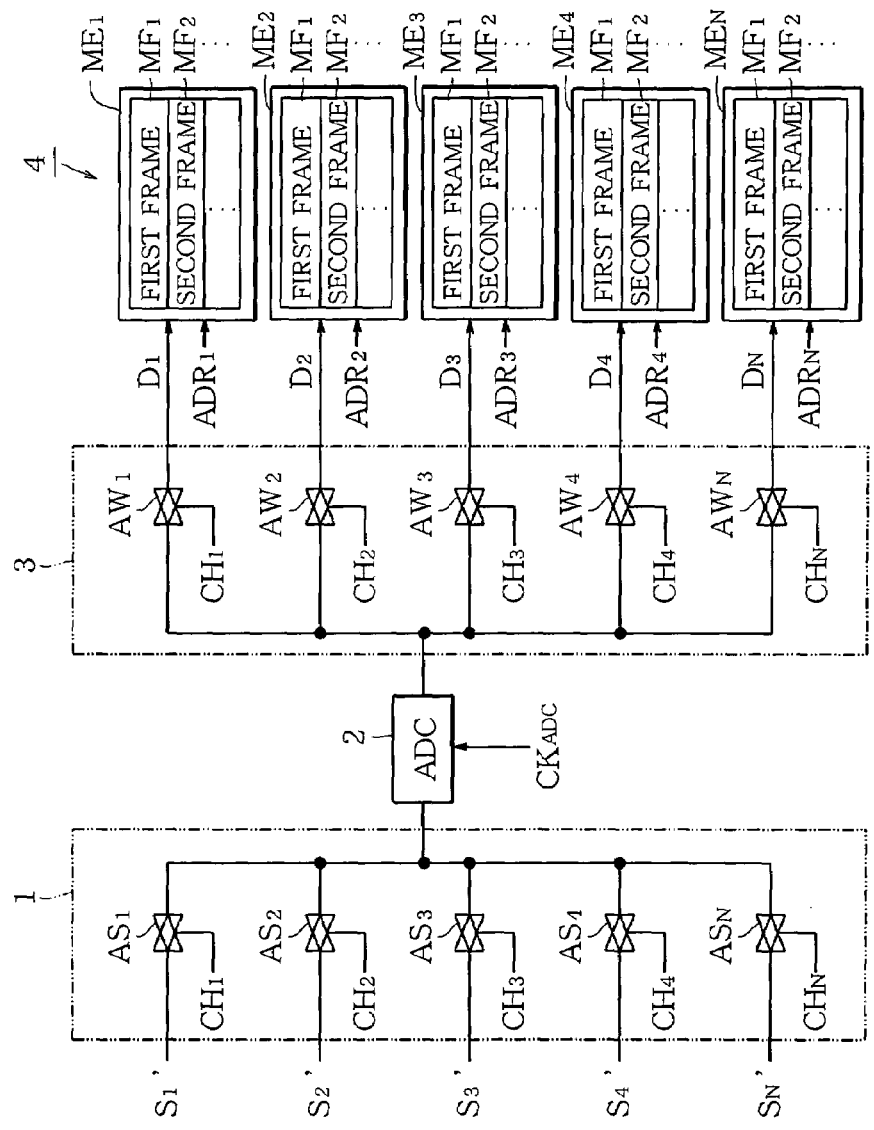
FIG. 4 is a block diagram showing the structures of a multiplexer, a demultiplexer and a storage section.

As shown in FIG. 4, the multiplexer 1 comprises analog switches $AS_1$ to $AS_N$ for N channels. The input speech signals $S_1'$–$S_N'$ from the pre-circuits $CC_1$–$CC_N$ are supplied to the input terminals of the respective analog switches $AS_1$–$AS_N$ whose output terminals are connected together to the A/D converter 2. In accordance with channel switch signals $CH_1$ to $CH_N$ supplied from the controller 8, the analog switches $AS_1$–$AS_N$ exclusively switch the input speech signals $S_1'$–$S_N'$ and supply the switched input speech signals $S_1'$–$S_N'$ to the A/D converter 2.

The A/D converter 2 convert the input speech signals $S_1'$–$S_N'$, sequentially supplied from the multiplexer 1, to digital input data $D_1$ to $D_N$ in synchronism with a predetermined sampling frequency f, and supplies the digital input data $D_1$–$D_N$ to the demultiplexer 3.

The sampling frequency f is set by a sampling clock $CK_{ADC}$ from the controller 8 and is determined in consideration of anti-aliasing. More specifically, the sampling frequency f is determined to be equal to or higher than approximately twice the high cut-off frequency $f_H$ of the band-pass filter, and is set, for example, in a range of 8 kHz to 11 kHz.

The demultiplexer 3 comprises analog switches $AW_1$ to $AW_N$ for N channels, as shown in FIG. 4. The analog switches $AW_1$–$AW_N$ have their input terminals connected together to the output terminal of the A/D converter 2 and their output terminals respectively connected to memory areas $ME_1$ to $ME_N$ for N channels provided in the storage section 4. In accordance with the channel switch signals $CH_1$–$CH_N$ supplied from the controller 8, the analog switches $AW_1$–$AW_N$ exclusively switch the input data $D_1$–$D_N$ and supply the switched input data $D_1$–$D_N$ to the respective memory areas $ME_1$–$ME_N$.

Figure 5:
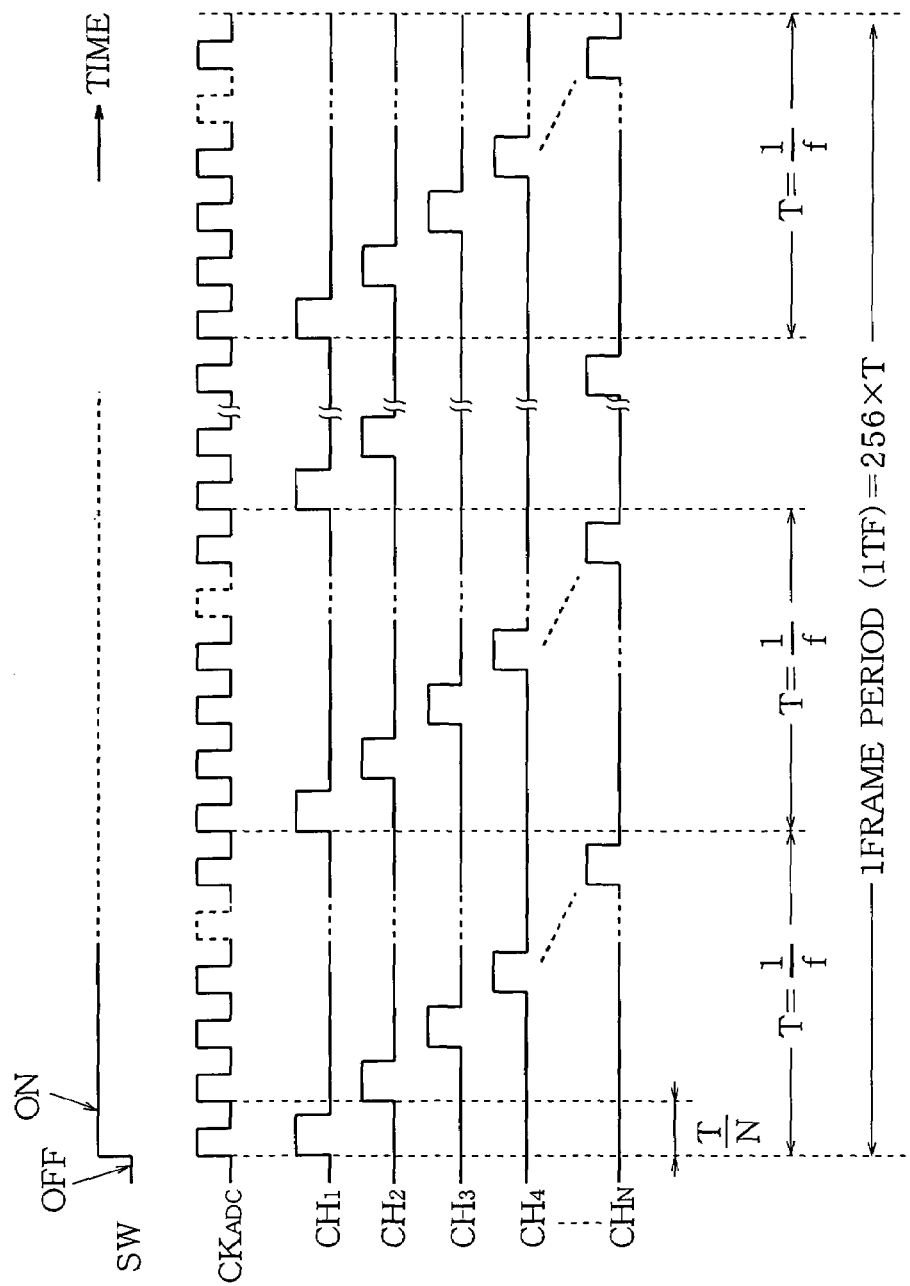
FIG. 5 is a timing chart for explaining the timings of sampling an input signal and storing sampled signals into a storage section.

Referring now to the timing chart in FIG. 5, the operations of the multiplexer 1, the A/D converter 2 and the demultiplexer 3 will be explained. When the speech switch 9 is set on, the resultant ON signal SW is received by the controller 8 which in turn outputs the sampling clock $CK_{ADC}$ and the channel switch signals $CH_1$–$CH_N$.

The sampling clock $CK_{ADC}$ has a pulse waveform which repeats the logical inversion N times during a period (sampling period) T which is the reciprocal, 1/f, of the sampling frequency f. The channel switch signals $CH_1$–$CH_N$ have pulse waveforms which sequentially become logic "1" every period T/N of the sampling clock $CK_{ADC}$.

The multiplexer 1 exclusively performs switching between enabling and disabling of the input speech signals $S_1'$–$S_N'$ in synchronism with the period T/N in which the channel switch signals $CH_1$–$CH_N$ sequentially become logic "1". As a result, the input speech signals $S_1'$–$S_N'$ are sequentially supplied to the A/D converter 2 in synchronism with the period T/N to be converted to the digital data $D_1$–$D_N$. The demultiplexer 3 likewise exclusively performs switching between enabling and disabling of the input data $D_1$–$D_N$ in synchronism with the period T/N in which the channel switch signals $CH_1$–$CH_N$ sequentially become logic "1". Accordingly, the input data $D_1$–$D_N$ from the A/D converter 2 are distributed and stored in the respective memory areas $ME_1$–$ME_N$ in synchronism with the period T/N.

As sampling N channels of input speech signals $S_1'$–$S_N'$ in the sampling period T (=1/f) is repeated this way, it is possible to generate N channels of input data $D_1$–$D_N$ with even the single A/D converter 2 in synchronism with the sampling frequency f and to store the input data $D_1$–$D_N$ into the predetermined memory areas $ME_1$–$ME_N$, respectively.

The storage section 4, which is constituted by a semiconductor memory, has the aforementioned memory areas $ME_1$–$ME_N$ for N channels. That is, the memory areas $ME_1$–$ME_N$ are provided in association with the microphones $M_1$–$M_N$.

As shown in FIG. 4, each of the memory areas $ME_1$–$ME_N$ has a plurality of frame areas $MF_1$, $MF_2$ and so forth for storing the associated one of the input data $D_1$–$D_N$ frame by frame of a predetermined number of samples.

Referring to the memory area $ME_1$, for example, the frame areas $MF_1$, $MF_2$ and so forth sequentially store the input data $D_1$ supplied from the demultiplexer 3 by a predetermined number of samples (256 samples in this embodiment) in accordance with an address signal $ADR_1$ from the controller 8. That is, every 256 samples of the input data $D_1$ are stored in each frame area $MF_1$, $MF_2$ or the like in each frame period TF which is 256×T as shown in FIG. 5. Input data for one frame period (1TF), which is stored in each frame area $MF_1$, $MF_2$ or the like, is called "frame data".

Likewise, the input data $D_2$–$D_N$ are stored, 256 samples each, in the frame area $MF_1$, $MF_2$ and so forth in the remaining memory areas $ME_2$–$ME_N$ in each frame period TF.

The speech detector 5 and the data analyzer 6 are constituted by a DSP (Digital Signal Processor).

Every time frame data is stored in the frame area $MF_1$, $MF_2$ and so forth in each of the memory areas $ME_1$–$ME_N$, the speech detector 5 computes the LPC (Linear Predictive Coding) residual of the latest frame data and determines if the computed value is equal to or greater than a predetermined threshold value THD1. When the computed value becomes equal to or greater than the predetermined threshold value THD1, the speech detector 5 determines that the latest frame data is speech frame data produced from a speech. When the computed value is smaller than the predetermined threshold value THD1, the speech detector 5 determines that the latest frame data is input data that has not been produced from a speech, i.e., noise frame data that has been produced by noise in a vehicle.

When the computed LPC residual value becomes equal to or greater than the predetermined threshold value THD1 over three frame periods (3TF), the speech detector 5 settles that the frame data over the three frame periods (3TF) is definitely speech frame data produced from a speech and transfers speech detection data DCT1 indicative of the result of the decision to the controller 8.

More specifically, the LPC residuals of frame data stored in the individual frame area $MF_1$, $MF_2$ and so forth in each of the memory areas $ME_1$–$ME_N$ are individually computed channel by channel, and each channel-by-channel computed LPC residual value is compared with the threshold value THD1 to determine, channel by channel, if the frame data is speech frame data produced from a speech.

Given that $\epsilon_1$ is the computed LPC residual value of the first channel associated with the microphone $M_1$, $\epsilon_2$ is the computed LPC residual value of the second channel associated with the microphone $M_2$ and likewise $\epsilon_3$ to $\epsilon_N$ are the computed LPC residual values of the third to N-th channels respectively associated with the microphones $M_3$–$M_N$, the computed values $\epsilon_1$–$\epsilon_N$ are compared with the threshold value THD1. The frame data that corresponds to the channel whose computed LPC residual value becomes equal to or greater than the threshold value THD1 is determined as speech frame data that has been generated from a speech. Further, the speech frame data that corresponds to the channel whose computed LPC residual value becomes equal to or greater than the threshold value THD1 over three frame periods (3TF) is settled as speech frame data that is definitely generated from a speech.

When a speech has been directed to the microphone $M_1$ and the uttered voices have not been input to the remaining microphones $M_2$–$M_N$, for example, only the frame data that is stored in the memory area $ME_1$ of the channel associated with the microphone $M_1$ is determined and settled as speech frame data that has been produced from the speech, and the frame data stored in the memory areas $ME_2$–$ME_N$ associated with the remaining microphones $M_2$–$M_N$ are determined as noise frame data generated from noise in the vehicle.

When a speech has been directed to the microphone $M_1$ and the uttered voices have reached the microphone $M_2$ but not the remaining microphones $M_3$–$M_N$, for example, the frame data stored in the memory areas $ME_1$ and $ME_2$ of the channels associated with the microphones $M_1$ and $M_2$ are both determined and settled as speech frame data produced from the speech, and the frame data stored in the memory areas $ME_3$–$ME_N$ associated with the remaining microphones $M_3$–$M_N$ are determined as noise frame data.

In the above-described manner, the speech detector 5 computes the LPC residual of each of the frame data stored in the memory areas $ME_1$–$ME_N$, compares it with the threshold value THD1 to determine if uttered voices have been input to any microphone and determine the frame period in which the uttered voices have been input, and transfers the speech detection data DCT1 having information on those decisions to the controller 8.

The speech detection data DCT1 is transferred to the controller 8 as predetermined code data which indicates the memory area where speech frame data has been stored over the aforementioned three frames or more (hereinafter this memory area will be called "speech memory channel") and its frame area (hereinafter called "speech memory frame").

Specifically, the speech detection data DCT1 has an ordinary data structure of, for example, DCT1{CH$_1$(TF$_1$, TF$_2$–TF$_m$), CH$_2$(TF$_1$, TF$_2$–TF$_m$), . . . , CH$_N$(TF$_1$, TF$_2$–TF$_m$)}. CH$_1$–CH$_N$ are flag data representing the individual channels, and TF$_1$, TF$_2$–TF$_m$ are flag data corresponding to the individual frame areas MF$_1$, MF$_2$–MF$_m$.

When an uttered speech is input only to the microphone $M_1$ and speech frame data is stored in the third and subsequent frame areas MF$_3$, MF$_4$ and so forth, speech detection data DCT of binary codes of DCT1{1(0,0,1,1-1), 0(0,0,0-0), . . . , 0(0,0,0-0)} is transferred to the controller 8.

When the speech detection data DCT1 is transferred, the controller 8 generates control data CNT1 indicating the speech memory channel and speech memory frame based on the speech detection data DCT1, and sends the control data CNT1 to the data analyzer 6

The data analyzer 6 comprises an optimal-speech determining section 6a, a noise determining section 6b, an average-S/N computing section 6c, an average-voice-power computing section 6d, an average-noise-power computing section 6e, a speech condition table 6f and a noise selection table 6g. When receiving the control data CNT1 from the controller 8, the data analyzer 6 initiates a process of determining speech frame data and noise frame data suitable for speech recognition.

The average-voice-power computing section 6d acquires information on the speech memory channel and speech memory frame from the control data CNT1, reads speech frame data from the memory area that corresponds to those speech memory channel and speech memory frame and computes average voice power P(n) of the speech frame data channel by channel. The variable n in the average voice power P(n) indicates a channel number.

When speech frame data is stored in the memory areas $ME_1$–$ME_4$ corresponding to the channels $CH_1$–$CH_4$ as shown in FIGS. 6A to 6D, for example, the average voice power P(1) to P(4) of plural pieces of speech frame data corresponding to a plurality of predetermined frame periods (m$_2$×TF) from a time t$_s$ at which a speech has started are computed channel by channel. The average voice power P(n) is computed by obtaining the sum of squares of speech frame data in the frame periods (m$_2$×TF) and then dividing the sum by the number of the frame periods (m$_2$×TF).

The average-noise-power computing section 6e acquires information on the speech memory channel and speech memory frame from the control data CNT1, reads noise frame data preceding the speech frame data by a plurality of frame periods (m$_1$×TF) from the memory area that corresponds to those speech memory channel and speech memory frame and computes average noise power NP(n) of the noise frame data channel by channel. The variable n in the average noise power NP(n) indicates a speech channel, and the average noise power NP(n) is computed by obtaining the sum of squares of noise frame data in the frame periods (m$_1$×TF) and then dividing the sum by the number of the frame periods (m$_1$×TF).

When speech frame data is stored in the memory areas $ME_1$–$ME_4$ corresponding to the channels $CH_1$–$CH_4$ as shown in FIGS. 6A to 6D, for example, the average noise power NP(n) of plural pieces of noise frame data preceding by a plurality of frame periods (m$_1$×TF) from the time t$_s$ at which a speech has started (at which storage of the speech frame data has started) are computed.

The average-S/N computing section 6c computes an average S/N value SN(n) which represents the value of the signal-to-noise ratio for each speech channel based on the average voice power P(n) computed by the average-voice-power computing section 6d and the average noise power NP(n) computed by the average-noise-power computing section 6e.

In the case where the channels $CH_1$–$CH_4$ are speech channels as shown in FIGS. 6A to 6D, for example, the average S/N values SN(1) to SN(4) of the individual channels $CH_1$–$CH_4$ are computed from the following equations 1 to 4.

$$SN(1)=P(1)/NP(1) \qquad (1)$$

$$SN(2)=P(2)/NP(2) \qquad (2)$$

$$SN(3)=P(3)/NP(3) \qquad (3)$$

$$SN(4)=P(4)/NP(4) \qquad (4)$$

Logarithmic values of the average S/N values SN(1) to SN(4) computed from the equations 1 to 4 may be taken as the average S/N values SN(1)–SN(4) of the individual channels $CH_1$–$CH_4$.

The optimal-speech determining section 6a compares the average S/N value SN(n) acquired by the average-S/N computing section 6c with a predetermined threshold value THD2, and compares the average voice power P(n) acquired by the average-voice-power computing section 6d with a predetermined threshold value THD3. The optimal-speech determining section 6a then collates the results of the comparison with the speech condition table 6f shown in FIG. 7 to determine which channel of speech frame data is suitable for the speech recognition process.

As shown in FIG. 7, the speech condition table 6f is storing reference data for ranking speech frame data in accordance with the relationship between the average S/N value and the threshold value THD2 and the relationship between the average voice power and the threshold value THD3. Referring to the speech condition table 6f based on the comparison results, the optimal-speech determining section 6a ranks the speech frame data suitable for speech recognition and determines the speech frame data of the highest rank as the one suitable for speech recognition.

Specifically, the optimal-speech determining section 6a determines the speech frame data whose average S/N value is equal to or greater than the threshold value THD2 and whose average voice power is equal to or greater than the threshold value THD3 as a rank 1 (Rnk1), determines the speech frame data whose average S/N value is equal to or greater than the threshold value THD2 and whose average voice power is less than the threshold value THD3 as a rank 2 (Rnk2), determines the speech frame data whose average S/N value is smaller than the threshold value THD2 and whose average voice power is equal to or greater than the threshold value THD3 as a rank 3 (Rnk3), and determines the speech frame data whose average S/N value is smaller than the threshold value THD2 and whose average voice power is less than the threshold value THD3 as a rank 3 (Rnk3).

Further, the optimal-speech determining section 6a determines the speech frame data in all the channels of speech frame data whose average S/N value and average voice power become maximum as a rank 0 (Rnk0).

Then, the optimal-speech determining section 6a determines the speech frame data that becomes the rank 0 (Rnk0) as a candidate most suitable for speech recognition (first candidate). Further, the optimal-speech determining section 6a determines the speech frame data that becomes the rank 1 (Rnk1) as the next candidate suitable for speech recognition (second candidate). When there are a plurality of channels whose speech frame data become the rank 1 (Rnk1), those speech frame data which have greater average S/N values and greater average voice powers are determined as candidates of higher ranks.

Further, the optimal-speech determining section 6a removes the speech frame data that correspond to the rank 2 (Rnk2) to the rank 4 (Rnk4) from the targets for speech recognition, considering that they are unsuitable for speech recognition.

In short, the optimal-speech determining section 6a compares the average S/N value SN(n) and the average voice power P(n) with the threshold values THD2 and THD3 respectively, collates the comparison results with the speech condition table 6f shown in FIG. 7 to determine the speech frame data that is suitable for speech recognition, and then puts a priority order or ranking to speech frame data suitable for speech recognition. Then, the optimal-speech determining section 6a transfers speech candidate data DCT2 indicating the ranking to the controller 8.

The noise determining section 6b collates combinations of all the ranks for N channels that are acquired by the optimal-speech determining section 6a with the noise selection table 6g shown in FIG. 8, and determines any channel for which the ranking combination has a match as a noise channel.

When the ranks of the individual channels starting at the first channel $CH_1$ are (Rnk0), (Rnk1), (Rnk2), (Rnk1), . . . , for example, the noise determining section 6b determines the third channel $CH_3$ as a noise channel. Then, the noise determining section 6b sends noise candidate data DCT3 to the controller 8.

When the optimal-speech determining section 6a determines a candidate of speech frame data suitable for speech recognition, the noise determining section 6b determines a noise channel corresponding to the candidate of speech frame data suitable for speech recognition by referring to the individual "cases" in FIG. 8. Accordingly, a candidate of speech frame data suitable for speech recognition and noise data obtained by the microphone that has picked up noise are determined in association with each other.

The individual cases 1, 2, 3 and so forth in the noise selection table shown in FIG. 8 are preset based on the results of experiments on the voice characteristics obtained when passengers actually uttered voices at various positions in a vehicle in which all the microphones $M_1$–$M_N$ were actually installed.

When the speech candidate data DCT2 and the noise candidate data DCT3 are supplied to the controller 8, the controller 8 accesses that of the memory areas $ME_1$–$ME_N$ which corresponds to the channel of the first candidate based on the speech candidate data DCT2, reads the speech frame data most suitable for speech recognition and supplies it to the speech recognizer 7.

The speech recognizer 7 performs known processes, such as SS (Spectrum Subtraction), echo canceling, noise canceling and CMN, based on the speech frame data and noise frame data supplied from the storage section 4 to thereby eliminate a noise component from the speech frame data, performs speech recognition based on the noise-component removed speech frame data and outputs data Dout representing the result of speech recognition.

If an adequate speech recognition result is not acquired from the speech recognition performed by the speech recognizer 7 based on speech frame data and the noise frame data suitable for speech recognition, the controller 8 accesses the memory area that corresponds to the channel of the next candidate suitable for speech recognition and transfers the corresponding speech frame data to the speech recognizer 7. Thereafter, the controller 8 supplies speech frame data of the channels of subsequent candidates in order to the speech recognizer 7 until the adequate speech recognition result is acquired.

Figure 9:
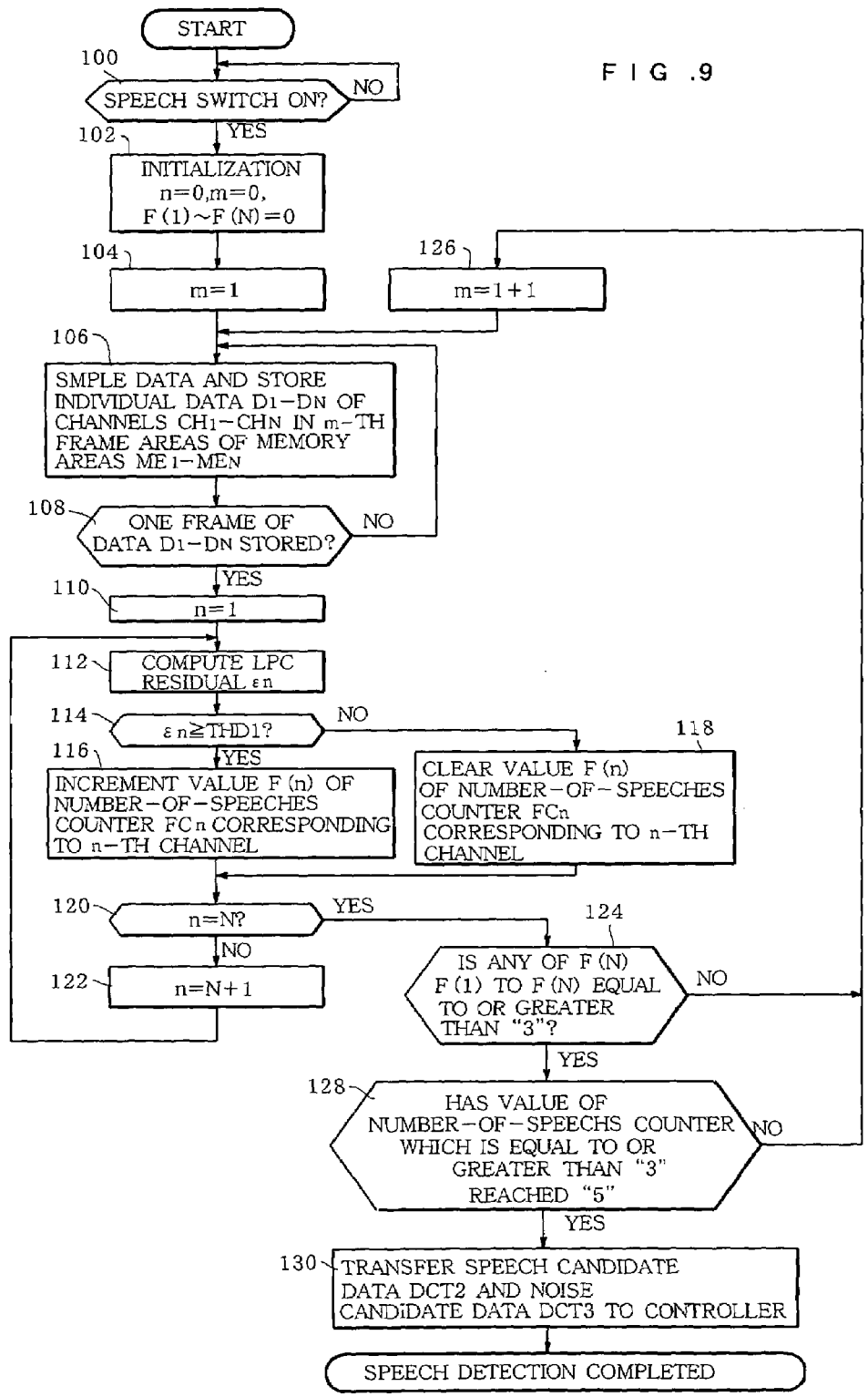
FIG. 9 is a flowchart for explaining the operation of the speech recognition system according to this embodiment.
Figure 10:
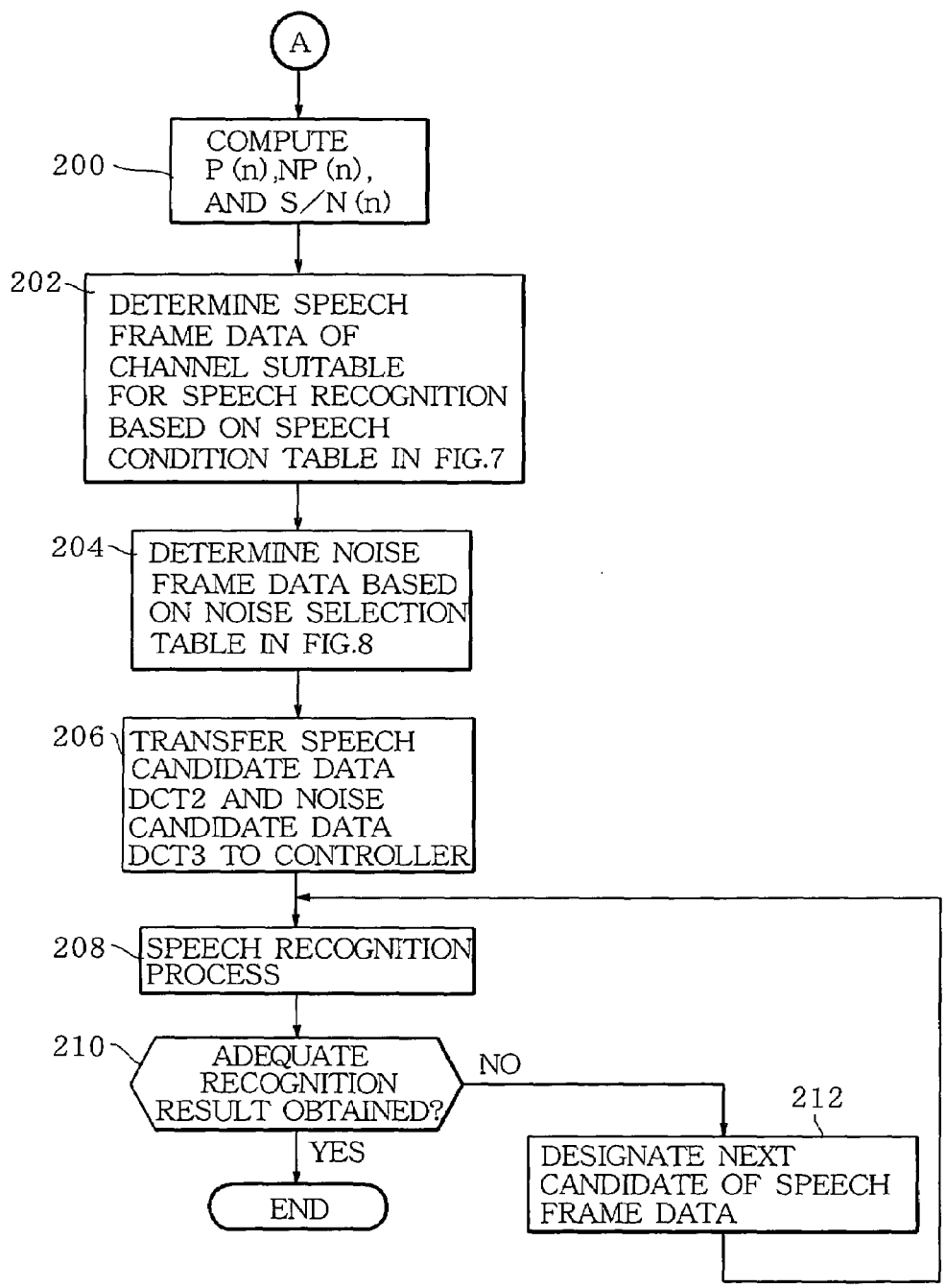
FIG. 10 is a flowchart for further explaining the operation of the speech recognition system according to this embodiment.

An example of the operation of this speech recognition system which has the above-described structure will be discussed with reference to the flowcharts shown in FIGS. 9 and 10. FIG. 9 illustrates an operational sequence from the pickup of sounds with the microphones $M_1$–$M_N$ to the storage of the input data $D_1$–$D_N$ into the storage section 4 as frame data, and FIG. 10 illustrates the operation at the time the data analyzer 6 determines optimal speech frame data and noise frame data.

In FIG. 9, the speech recognition system stands by until the speech switch 9 is switched on in step 100. Upon occurrence of the ON event of the speech switch 9, the flow goes to step 102 to perform initialization. This initializing process clears a count value n of a channel-number counter, a count value m of a frame-number counter and all values F(1) to F(N) of the number-of-speeches counters $FC_1$–$FC_N$, all provided in the controller 8.

The channel-number counter is provided to designate each of the channels of the microphones $M_1$–$M_N$ with the count value n. The frame-number counter is provided to designate the number (address) of each of the frame areas $MF_1$, $MF_2$, $MF_3$ and so forth, provided in the each of the memory areas $ME_1$–$ME_N$, with the count value m.

N number-of-speeches counters $FC_1$–$FC_N$ are provided in association with the individual channels. That is, the first number-of-speeches counter $FC_1$ is provided in association with the first channel, the second number-of-speeches counter $FC_2$ is provided in association with the second channel, and so forth to the N-th number-of-speeches counter $FC_N$ provided in association with the N-th channel. The number-of-speeches counters $FC_1$–$FC_N$ are used to determine whether or not an LPC residual $\epsilon_n$ greater than the threshold value THD1 has consecutively continued over three or more frames and to determine the channel for which the LPC residual $\epsilon_n$ has continued over three or more frames. The number-of-speeches counters $FC_1$–$FC_N$ are also used to determine, as a speech-input channel, the channel for which the LPC residual $\epsilon_n$ has continued over three or more frames.

In the next step 104, the first frame area $MF_1$ of each of the memory areas $ME_1$–$ME_N$ is set. That is, the number, m, of the frame area is set to m=1.

In subsequent steps 106 and 108, the microphones $M_1$–$M_N$ start picking up sounds and the input data $D_1$–$D_N$ acquired by the voice pickup are stored in the individual first frame areas $MF_1$ of the memory areas $ME_1$–$ME_N$ frame by frame.

When one frame of input data $D_1$–$D_N$ is stored, the memory area $ME_1$ that corresponds to the first (n=1) channel is designated in step 110, and the LPC residual $\epsilon_n$ (n=1) of frame data stored in the first (m=1) frame area $MF_1$ of the memory area $ME_1$ is computed in step 112.

In the next step 114, the LPC residual $\epsilon_n$ is compared with the threshold value THD1. When $\epsilon_n \geq THD1$, the flow goes to step 116 to increment (or adds "1" to) the value F(1) of the number-of-speeches counter $FC_1$ corresponding to the first channel by "1". When $\epsilon_n < THD1$, the flow goes to step 118 to clear the value F(1) of the number-of-speeches counter $FC_1$.

When $\epsilon_n$ becomes equal to or greater than THD1 ($\epsilon_n \geq THD1$), therefore, the value F(1) of the number-of-speeches counter $FC_1$ becomes "1" which indicates that one frame of speeches has been input to the microphone $M_1$ of the first channel.

When $\epsilon_n$ becomes smaller than THD1 ($\epsilon_n < THD1$), on the other hand, the value F(1) of the number-of-speeches counter $FC_1$ is cleared to "0" which indicates that no speeches have been input to the microphone $M_1$ of the first channel.

Next, it is checked if n is equal to N (n=N) in step 120 to determine whether the LPC residual $\epsilon_n$ in every channel has been computed. When n=N is not met, the flow goes to step 122 to make n=n+1 to set the next channel, and the sequence of processes from step 112 is repeated. That is, by repeating the processes of steps 112 to 122, the LPC residual $\epsilon_n$ of frame data stored in the frame area $MF_1$ of each of the memory areas $ME_1$–$ME_N$ is compared with the threshold value THD1. When the LPC residual $\epsilon_n$ becomes equal to or greater than the threshold value THD1, the value F(n) of the number-of-speeches counter $FC_1$ corresponding to that channel number n is incremented by "1".

When n=N is met in the aforementioned step 120, it is determined that the processing for all the channels has been completed, then the flow proceeds to step 124.

In step 124, it is determined if any one of the values F(1) to F(N) of the number-of-speeches counters $FC_1$–$FC_N$ has become equal to or greater than "3". If there is no such a count value, i.e., if any of the values F(1) to F(N) is equal to or smaller than "2", the flow goes to step 126.

In step 126, the individual second frame areas $MF_2$ of the memory areas $ME_1$–$ME_N$ 1 are set by setting m=m+1. Then, the processes of steps 106 to 124 are repeated.

Accordingly, the input data is stored in each frame area $MF_2$ (steps 106 and 108), the LPC residual $\epsilon_n$ of each frame data stored in each frame area $MF_2$ is compared with the threshold value THD1 (steps 110 to 114), and each of the values F(1) to F(N) of the number-of-speeches counters $FC_1$–$FC_N$ is incremented or cleared based on the comparison results.

In step 124, it is determined again if any one of the values F(1) to F(N) of the number-of-speeches counters $FC_1$–$FC_N$ has become equal to or greater than "3". If there is no such a count value, the flow goes to step 126 to set m=m+1 so that the next frame areas $MF_3$ of the memory areas $ME_1$–$ME_N$ 1 are set. Then, the processes of steps 106 to 124 are repeated.

As the processes of steps 106 to 124 are repeated and at least one of the values F(1) to F(N) of the number-of-speeches counters $FC_1$–$FC_N$ becomes equal to or greater than "3", the flow proceeds to step 128.

In other words, in step 124, the values F(1) to F(N) of the number-of-speeches counters $FC_1$–$FC_N$ are checked and only when the LPC residual $\epsilon_n$ greater than the threshold value THD1 consecutively continues over three or more frames, frame data stored in the memory area corresponding to that channel is determined and settled as speech frame data.

In the next step 128, it is determined if the value of the number-of-speeches counter for which it was determined the LPC residual $\epsilon_n$ greater than the threshold value THD1 consecutively continued over three or more frames has reached "5". If that value has not reached "5" yet, the process in step 126 is carried out after which the processes of steps 106 to 128 are repeated.

There may be a case where when the value F(n) of the number-of-speeches counter that corresponds to a given channel n becomes "3", the value of the number-of-speeches counters corresponding to the remaining channels is "1" or "2". In this case, frame data stored in the memory areas corresponding to the remaining channels are likely to be also speech frame data.

To cope with this case, therefore, the processes of steps 106 to 128 are repeated twice to check if the frame data stored in the memory areas corresponding to the remaining channels are speech frame data.

When the decision in step 128 is "YES", the flow goes to step 130 where the speech detection data DCT1 which has information on the memory area where speech frame data is stored and the memory area where noise frame data is stored is transferred to the controller 8. The flow then proceeds to a routine illustrated in FIG. 10.

When the operation goes to the routine illustrated in FIG. 10, the average voice power P(n), the average noise power NP(n) and the average S/N value SN(n) for each channel are computed first in step 200. Next, a candidate of speech frame data suitable for speech recognition is determined based on the speech condition table 6f shown in FIG. 7 in step 202. In the next step 204, noise frame data suitable for speech recognition is determined based on the noise selection table 6g shown in FIG. 8.

In step 206, the speech candidate data DCT2 that indicates the candidate of speech frame data suitable for speech recognition and the noise candidate data DCT3 that indicates the noise frame data are sent to the controller 8 from the data analyzer 6. In other words, the speech candidate data DCT2 and the noise candidate data DCT3 inform the controller 8 of the candidate of speech frame data suitable for speech recognition and noise frame data suitable for speech recognition associated with that candidate.

In the next step 208, the speech recognizer 7 read the speech frame data and noise frame data most suitable for speech recognition from the storage section 4, performs speech recognition on the read speech frame data and noise frame data, and terminates a sequence of speech recognition processes when an adequate speech recognition result is acquired as determined by step 210.

When no adequate speech recognition result is acquired in step 210, on the other hand, the speech recognizer 7 checks in step 212 if there are next candidates of speech frame data and noise frame data, reads the next candidates of speech frame data and noise frame data, if present, from the storage section 4 and repeats the sequence of processes starting at step 208. When no adequate speech recognition result is obtained even after re-execution of the speech recognition, the speech recognizer 7 likewise reads next candidates of speech frame data and noise frame data from the storage section 4 and repeats the sequence of processes in steps 208 to 212 until the adequate speech recognition result is obtained.

According to this embodiment, as apparent from the above, a plurality of microphones $M_1$–$M_N$ for inputting voices are placed in a vehicle and speech frame data and noise frame data suitable for speech recognition are automatically extracted from those speech frame data and noise frame data that are picked up by the microphones $M_1$–$M_N$ and are subjected to speech recognition. This speech recognition system can therefore provide a plurality of speakers (passengers) with a better operability than the conventional speech recognition system that is designed for a single speaker.

When one of a plurality of passengers directs a desired speech to a certain microphone (e.g., $M_1$), the uttered speech may generally be picked up by the other microphones ($M_2$–$M_N$) so that it is difficult to determine which microphone has actually been intended to pick up the uttered speech. According to this embodiment, however, speech frame data and noise frame data suitable for speech recognition are automatically extracted by using the speech condition table 6f and the noise selection table 6g, respectively shown in FIGS. 7 and 8, and speech recognition is carried out based on the extracted speech frame data and noise frame data. This makes it possible to associate the passenger who has made the speech with the microphone (e.g., $M_1$) close to that passenger with a very high probability.

Accordingly, this speech recognition system automatically specifies a passenger who tries to perform a voice-based manipulation of an electronic equipment installed in a vehicle and allows the optimal microphone (close to the passenger) to pick up the uttered speech. This can improve the speech recognition precision. With the use of this speech recognition system, a passenger requires a special manipulation but merely needs to utter words to give this or her voiced instruction through the appropriate microphone, so that this speech recognition system is considerably easy to use.

Suppose that while one or more passengers who do not intend to perform a voice-based manipulation of an on-board electronic equipment are making a conversation or the like, one person utters words to perform such a voice-based manipulation. Even in this case, the conversation or the like made by the passengers who are not performing the voice-based manipulation is determined as noise and eliminated from consideration by automatically extracting speech frame data and noise frame data suitable for speech recognition by using the speech condition table 6f and the noise selection table 6g, respectively shown in FIGS. 7 and 8, and then carrying out speech recognition based on the extracted speech frame data and noise frame data. This can provide a speech recognition system which is not affected by a conversation or the like taking place in a vehicle around and which is very easy to use.

Although this embodiment is provided with the single speech switch 9, shown in FIG. 1, which is switched on by, for example, a driver, this invention is not limited to this particular structure. For example, a plurality of microphones $M_1$–$M_N$ may be respectively provided with speech switches $TK_1$ to $TK_N$ as shown in the block diagram in FIG. 11, so that when one of the speech switches is set on, the controller 8 allows the microphone that corresponds to the activated speech switch to pick up words and determines that the remaining microphones corresponding to the inactive speech switches have picked up noise in the vehicle.

This modified structure can specify the microphone that has picked up an uttered speech and the microphones that have picked up noise before speech recognition. This can shorten the processing time for easily determining speech data and noise data most suitable for speech recognition.

Figure 11:
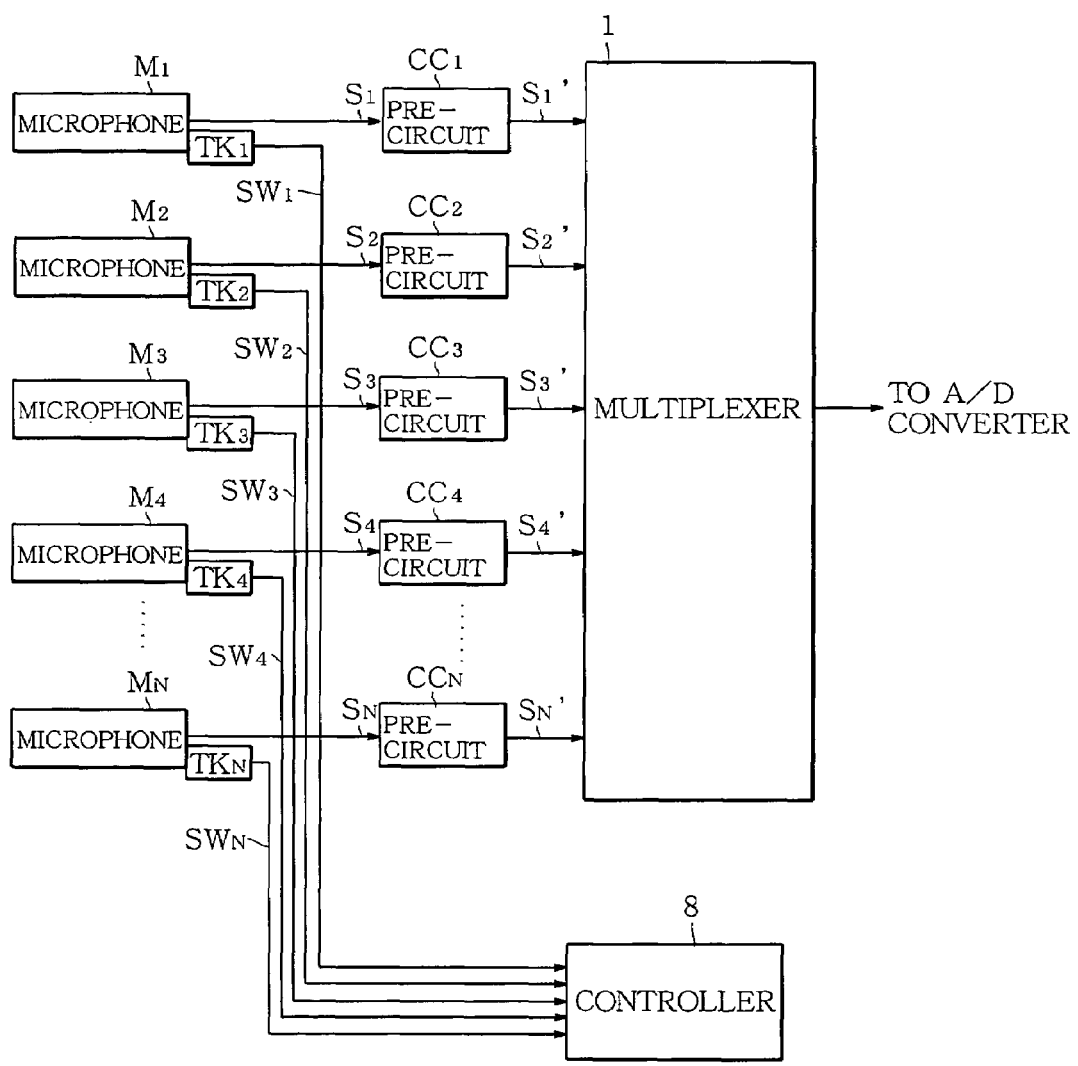
FIG. 11 is a block diagram illustrating the structure of a modification of the speech recognition system according to this embodiment.

Further, the structure shown in FIG. 1 and the structure shown in FIG. 11 may be combined as needed. Specifically, speech switches smaller in number than the microphones $M_1$–$M_N$ may be placed at adequate locations in a vehicle so that when one of the speech switches is set on, the controller 8 detects the event and initiates speech recognition. In this case, the speech switches do not completely correspond one-to-one to the microphones $M_1$–$M_N$, so that while speech recognition is carried out with the structure shown in FIG. 1, the microphone that has picked up an uttered speech and the microphones that have picked up noise before speech recognition can be specified before speech recognition. This can shorten the processing time for determining speech data and noise data suitable for speech recognition.

In the case where the structure in FIG. 1 is adapted to the case where speech switches smaller in number than the microphones $M_1$–$M_N$ are provided, each speech switch may be determined as the layout range for the associated microphone or microphones and one or more microphones belonging to each layout range may be specified previously depending on which speech switch has been set on. With this structure, those which are suitable for speech recognition have only to be extracted from pre-specified single or plural speech frame data and noise frame data, thus making it possible to shorten the processing time.

Although the foregoing description of this embodiment and modifications has been given of a speech recognition system adapted to an on-board electronic equipment, the speech recognition system of this invention can also be adapted to other types of electronic apparatuses, such as a general-purpose microcomputer system and a so-called word processor, to enable voice-based entry of sentences or voice-based document edition.

According to this invention, in short, when a speaker makes a desired speech, a speech signal and a noise signal suitable for speech recognition are automatically determined from the individual speech signals output from a plurality of voice pickup sections (or voice pickup means) and speech recognition is carried out based on the determined speech signal and noise signal. Accordingly, the speaker has only to utter words or voices without consciously making such a speech to a specific voice pickup section. This leads to an improved operability of the speech recognition system.

Although only one embodiment of the present invention and some modifications thereof have been described herein, it should be apparent to those skilled in the art that the present invention may be embodied in many other specific forms without departing from the spirit or scope of the invention. Therefore, the present examples and embodiment are to be considered as illustrative and not restrictive and the invention is not to be limited to the details given herein, but may be modified within the scope of the appended claims.

What is claimed is:

1. A speech recognition system comprising:
   a plurality of voice pickup means for picking up uttered voices;
   determination means for determining a speech signal suitable for speech recognition from speech signals output from said plurality of voice pickup means; and
   speech recognition means for performing speech recognition based on said speech signal determined by said determination means,
   wherein said determination means acquires an average S/N value and average voice power of each of said speech signals output from said plurality of voice pickup means and selects said speech signal whose average S/N value and average voice power are greater than respective predetermined threshold values as said speech signal suitable for speech recognition, and
   wherein said determination means determines a candidate order of those speech signals whose average S/N values and average voice powers are greater than said respective predetermined threshold values and which are candidates for said speech signal suitable for speech recognition, in accordance with said average S/N values and average voice powers; and
   said speech recognition means sequentially executes speech recognition on said candidates in accordance with said candidate order from a highest candidate to a lower one.

2. A speech recognition system comprising:
   a plurality of voice pickup sections for picking up uttered voices;
   a determination section for determining a speech signal suitable for speech recognition from speech signals output from said plurality of voice pickup sections; and
   a speech recognizer for performing speech recognition based on said speech signal determined by said determination section,
   wherein said determination section acquires an average S/N value and average voice power of each of said speech signals output from said plurality of voice pickup sections and selects said speech signal whose average S/N value and average voice power are greater than respective predetermined threshold values as said speech signal suitable for speech recognition, and
   wherein said determination section determines a candidate order of those speech signals whose average S/N values and average voice powers are greater than said respective predetermined threshold values and which are candidates for said speech signal suitable for speech recognition, in accordance with said average S/N values and average voice powers; and
   said speech recognizer sequentially executes speech recognition on said candidates in accordance with said candidate order from a highest candidate to a lower one.

3. A speech recognition method for a speech recognition system having a plurality of voice pickup means for picking up voices, comprising:
   a voice pickup step of picking up uttered voices using said plurality of voice pickup means;
   a determination step of determining a speech signal suitable for speech recognition from speech signals output from said plurality of voice pickup means; and
   a speech recognition step of performing speech recognition based on said speech signal determined by said determination step,
   wherein said determination step includes a step of acquiring an average S/N value and average voice power of each of said speech signals output from said plurality of voice pickup means and selecting said speech signal whose average S/N value and average voice power are greater than respective predetermined threshold values as said speech signal suitable for speech recognition,
   wherein said determination step further includes a step of determining a candidate order of those speech signals whose average S/N values and average voice powers are greater than said respective predetermined threshold values and which are candidates for said speech signal suitable for speech recognition, in accordance with said average S/N values and average voice powers; and
   said speech recognition step sequentially executes speech recognition on said candidates in accordance with said candidate order from a highest candidate to a lower one.

* * * * *